3,223,582
ANTIMICROBIC COMPOSITIONS AND USE THEREOF

Jakob Bindler, Riehen, near Basel, and Ernst Model, Basel, Switzerland, assignors to Geigy Chemical Corporation, Ardsley, N.Y., a corporation of Delaware
No Drawing. Filed June 6, 1962, Ser. No. 200,355
Claims priority, application Switzerland, June 7, 1961, 6,605/61
17 Claims. (Cl. 167—30)

The present invention concerns antimicrobic compositions and their use for the combatting of bacteria and, possibly, also fungi and for the protection of organic materials and objects from attack primarily by bacteria and, possibly, also fungi, as well as, as industrial product, the organic materials protected by the aid of these antimicrobic agents primarily from attack by bacteria (and possibly also from attack by fungi or from rot).

By "antimicrobic agents" in the present application, protective agents against bacteria are meant which contain active ingredients having bactericidal or bacteriostatic properties which active ingredients in addition also have more or less marked fungicidal or fungistatic properties.

The antimicrobic compositions according to the invention contain, as active ingredients, aromatic acid amide derivatives of the general formula

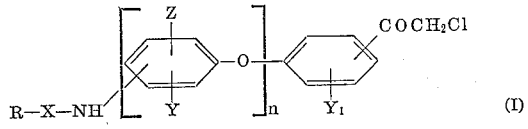

(I)

wherein $n$ is the number 0 or 1,
$Y_1$ is hydrogen or a chlorine atom,
$Y_2$ is hydrogen or, if $Y_1$ is hydrogen, it can also be a chlorine atom,
$Z$ is hydrogen or the chloroacetyl group —$COCH_2Cl$,
$R$ is an alkyl radical, if desired monochloro- or polychloro-alkyl having 1 to 3 carbon atoms or, if $n$ is 0, it can also be a phenyl radical, if desired monochloro- or polychloro-phenyl, the amino group, an alkylamino radical having at most 5 carbon atoms, a dialkylamino radical, having in total at most 5 carbon atoms, or a phenylamino radical, the latter if desired monosubstituted by a monochloroacetyl group, and
$X$ is the —CO— group and, if $R$ is an alkyl radical, $X$ can also be the —$SO_2$— group.

These active ingredients have excellent antimicrobic, in particular bactericidal or bacteriostatic properties, and in addition can also have fungicidal or fungistatic activity. They are only slightly toxic for warm blooded animals, they have no irritant action on the skin and are thus excellently suitable as active substances for the combatting of bacteria and fungi as well as for the protection of organic materials, including the human skin, from attack by bacteria and fungi and for the protection of organic materials from injury by rot.

Preferred active substances are those in which $X$ is the carbonyl group —CO—.

The following preferred chloroacetylated acid amide derivatives according to the above definition are employed as antimicrobic active substances to be used according to the invention:

(a) Chloroacetylated, aliphatic or aromatic carboxylic acid or sulphonic acid anilides, particularly acetanilides, of the general formula

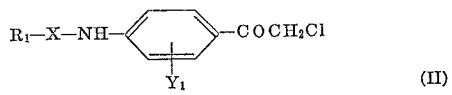

(II)

wherein $R_1$ represents an alkyl radical, if desired monochloro- or polychloro-alkyl, having at most 3 carbon atoms, in particular a methyl radical or monochloromethyl or polychloromethyl or a phenyl radical which can be monochlorinated if desired,
$Y_1$ represents hydrogen or a chlorine atom, and
$X$ represents the —CO— group which, if $R_1$ is an alkyl or chlorinated alkyl group, can also be replaced by the —$SO_2$— group.

Active substances of the general Formula II are, for example:

4-chloroacetyl-acetanilide,
4-chloroacetyl-2-chloroacetanilide,
4-chloroacetyl-3-chloroacetanilide,
4-chloroacetyl-$\alpha$-chloracetanilide,
4-chloroacetyl-$\alpha,\alpha$-dichloracetanilide,
4-chloroacetyl-$\alpha,\alpha,\alpha$-trichloracetanilide,
4-chloroacetyl-n-butyrylanilide,
4-chloroacetyl-(p-chlorobenzoyl)-anilide,
4-chloroacetyl-methylsulphanilide.

(b) Chloroacetylated diphenyl ether amides of the general formula

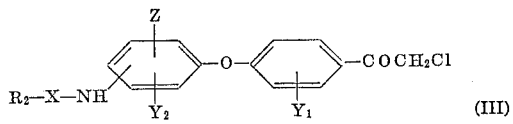

(III)

wherein $X$ represents the —CO— or —$SO_2$— group,
$R_2$ represents an alkyl radical, if desired monochloro- or polychloro-alkyl having at most 3 carbon atoms, preferably a methyl radical or monochloromethyl or polychloromethyl and
$Y_1$, $Y_2$ and $Z$ have the meanings given above.

Examples of active substances of the general Formula III are the following:

4-chloroacetyl-4'-acetamido-diphenyl ether,
4-chloroacetyl-4'-chloro-2'-acetamido-dipheyl ether,
4-chloroacetyl-4'-chloroacetamido-diphenyl ether,
4-chloroacetyl-2'-chloro-4'-acetamido-diphenyl ether,
4-chloroacetyl-2'-chloro-4'-chloroacetamido-diphenyl ether,
4,5'-bis-chloroacetyl-2-chloro-2'-acetamido-diphenyl ether,
4-chloroacetyl-4'-methane sulphonamido-diphenyl ether.

(c) Chloroacetylated urea derivatives of the general formula

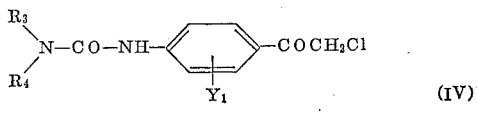

(IV)

wherein $Y_1$ represents hydrogen or chlorine, $R_3$ represents hydrogen, an alkyl radical with up to 5 carbon atoms or a phenyl radical or a phenyl substituted by at most one $ClCH_2CO$—, and $R_4$ represents hydrogen or a low alkyl radical, whereby alkyl radicals $R_3$ and $R_4$ together should not contain more than 5 carbon atoms.

The following compounds are given as examples of active substances of the general Formula IV:

N-(4-chloroacetylphenyl)-urea,
N-n-butyl-N'-(4-chloroacetylphenyl)-urea,
N-diethyl-N'-(4-chloroacetylphenyl)-urea,
N,N'-bis-(4-chloroacetylphenyl)-urea,
N-phenyl-N'-(4-chloroacetylphenyl)-urea,
N-n-amyl-N'-(4-chloroacetylphenyl)urea.

Those of the active substances to be used according to the invention can be easily produced by known methods.

In general, they are obtained from carboxylic or sulphonic acid anilides or N-phenyl ureas or diphenyl ether amides, possibly substituted as defined, by introduction of the chloroacetyl group with chloroacetyl chloride in the presence of $AlCl_3$ according to Friedel-Crafts. Also such acid anilides or phenyl ureas can be reacted with acetyl chloride according to Friedel-Crafts to introduce the acetyl group into the aromatic nucleus thereof and then the acetyl group can be chlorinated.

Vice versa, correspondingly substituted anilines or diphenyl ether amines can be used as starting materials and the amino group can be converted into an acid amide group by acylation or a chloroacetylaniline can be converted in the known manner into a urea derivative, e.g., by reaction with suitably substituted isocyanates or carbamic acid chlorides.

In general, the active substances according to the invention are colourless to pale yellowish coloured solid bodies which can be purified by recrystallisation. They are only slightly soluble in water but dissolve in the usual organic solvents. These solubility properties in organic solvents which are used for so-called dry cleaning, enable the active substances to be used as organic solutions in the form of sprays or as dry cleaners in the presence of neutral to weakly alkaline wetting and cleansing agents. Also the active substances can be admixed with paper treatment liquors or printing thickeners made from starch or cellulose derivatives or they can be used for the impregnation of wood. Also in objects made from synthetic resin such as, e.g., polyvinyl chloride films, etc., as well as in lacquers and paints which contain, e.g., casein or synthetic resins, an effective protection can be attained with the substances to be used according to the invention against attack by bacteria and, possibly, fungi.

The active substances given above and others of the general Formula I or of the narrower general Formulae II to IV are distinguished by only slight toxicity to warm blooded animals and are, in practice, non irritant to skin and eyes. These active substances can also be used in synthetic washing and cleansing agents in solid form such as tablets or bars, which agents contain, for example, non-ionogenic products or fatty acid condensation products as wash active component. But the active substances can also be used in anion-active or cation-active washing and cleansing agents such as soda soaps etc. The active substances according to the invention have an excellent action in particular against bacteria, both gram positive as well as gram negative such as, e.g., *Escherichia coli*. They can also have a fungicidal action which, depending on the active substance, is more or less marked; some of the active substances have a very good action against fungi.

Another advantage is their lack of, or only pale, colour, which property enables them to be used for many purposes for which the known strongly coloured compounds cannot be used.

The antimicrobic active substances can be applied to the organic material to be protected either by simple admixture or by impregnation with solutions or suspensions of the active substance. Contents of 5 to 20 grams (g.) of active substance per litre treatment liquor are generally sufficient to attain effective protection of the sprayed or impregnated material against attack by bacteria and fungi, rot, or formation of mildew spots. Organic material containing 0.5 to 2% of active substance, calculated on the weight of the material, is generally effectively and lastingly protected against attack by bacteria and, possibly, also fungi. Organic material to be protected are chiefly cellulose materials such as cellulose, wood, paper, materials made from synthetic resin as well as lacquers and paints. However, also other organic substances which tend to mould or rot can be protected such as leather, vegetable or animal mucilages and jells, permanent sizings made from polyvinyl etc.

The good activity of the active substances to be used according to the invention against bacteria can be seen from the following laboratory test:

By producing solutions of varying concentration of the active substance to be tested in ethylene glycol monomethyl ether (methyl Cellosolve) and addition of 1.25% of these methyl Cellosolve solutions to 20 ml. agar, nutrient media are produced which contain the following 8 final concentrations of active substance in p.p.m. (= parts of active substance per $10^6$ parts substratum): 300; 100; 30; 10; 3; 1; 0.3 and 0.1.

After solidifying, the agar nutrient media are inoculated with 24 hour old cultures of the following strains of bacteria:

*Staphylococcus aureus* SG 511
*Escherichia coli* 96
*Bacillus mesentericus*
*Sarcina lutea*

The dishes containing the agar media injected with bacteria are kept for 48 hours at 37° and the growth of the organisms on the agar is evaluated visually. The following table gives the results of the test, in which the lowest concentration of active substance in p.p.m. (= parts of active substance per 1 million parts of carrier substance) is given at which complete inhibition of growth can be observed.

The following active substances were used for this test:

I. 4-chloroacetyl-acetanilide,
II. 4-chloroacetyl-3-chloracetanilide,
III. 4-chloroacetyl-α-chloracetanilide,
IV. 4-chloroacetyl-α,α-dichloracetanilide,
V. 4-chloroacetyl-α,α,α-trichloracetanilide,
VI. 4-chloroacetyl-(4'-chlorobenzoyl)-anilide,
VII. 4-chloroacetyl-4'-chloroacetamido-diphenyl ether,
VIII. 4,5'-bis-chloroacetyl-2-chloro-2'-acetamido-diphenyl ether,
IX. 4-chloroacetyl-2'-chloro-4'-acetamido-diphenyl ether,
X. 4-chloroacetyl-4'-methylsulphonamido-diphenyl ether,
XI. N,N'-bis-(4'-chloroacetylphenyl)-urea,
XII. N-phenyl-N'-(4-chloroacetylphenyl)-urea,
XIII. N-n-butyl-N'-(4-chloroacetylphenyl)-urea.

TABLE

| Substance | Staph. aureus | Esch. coli | Bac. mes. | Sarc. lut. |
|---|---|---|---|---|
| I | 10 | 10 | 30 | 30 |
| II | 3 | 3 | 30 | 3 |
| III | 1 | 10 | 10 | 10 |
| IV | 1 | 10 | 10 | 3 |
| V | 1 | 30 | 10 | 10 |
| VI | 0.3 | 3 | 3 | 3 |
| VII | 3 | 10 | 3 | 3 |
| VIII | 3 | 30 | 3 | 1 |
| IX | 3 | 30 | 3 | 3 |
| X | 3 | 10 | 10 | 10 |
| XI | 1 | 30 | 10 | 1 |
| XII | 0.3 | 3 | 10 | 1 |
| XIII | 0.3 | 10 | 30 | 10 |

From the above table the uniformly wide action spectrum and the excellent action of the substances used according to the invention, which also covers gram-negative bacteria such as, e.g., *Escherichia coli*, can be seen.

The active substances of the general Formula I according to the invention can also be used in combination with other fungicidal and/or bactericidal substances, e.g., together with halogenated salicylic acid alkylamides and anilides, halogenated diphenyl ureas, halogenated benzoxazolones, polychlorohydroxydiphenylmethanes, halogenated dioxy-diphenyl sulphides etc.

On using the active substances according to the invention simultaneously with other bactericidal or fungicidal compounds, often a better action can be determined than would have been expected from the sum of the two effects (synergism).

In the bacteriostatic test, mixtures of active substances according to the invention such as, e.g. 4-chloroacetyl-acetanilide and 4 - chloroacetyl - 4' - chloroacetamidodiphenyl ether with known bacteriostatica such as 3-trifluoromethyl-4,4'-dichlorodiphenyl urea, 3,4,4'-trichloro-2'-hydroxydiphenyl urea etc. clearly show a synergistic increase in action. 4-chloroacetyl-4'-chloroacetamidodiphenyl ether mixed with 2-hydroxy-3,5-dichlorobenzoic acid-3',4'-dichloroanilide or with hexachlorophene (2,2'-dihydroxy - 3,5,6,3',5',6' - hexachloride phenyl methane) also has a clear increase of action.

In the following application examples, parts are given as parts by weight where not otherwise expressly stated; percentages are to be understood as percentages by weight and the temperatures are in degrees centigrade.

Example 1.—Paint 130 parts of an emulsion paint having a 75% content of solid substances and consisting of 36 parts of chalk
9 parts of titanium dioxide
22.5 parts of Mowilite DO 25 (Hoechst)
0.5 parts of Melloid TD
10 parts of pigment paste of about 60% solid component
ad 100 parts of water are mixed with 8 parts of a 25% stock solution of 4-chloro-acetyl-acetanilide, ethylene glycol monomethyl ether and dimethyl formamide 1:1 serving as solvents. This produces a paint which contains 2% of active substance calculated on the solid content. In the same way, using 1.6 or 0.32 part of active substance, paints are produced which contain 0.4 and 0.08% respective of 4-chloroacetyl-acetanilide calculated on the solid content.

Pieces of cardboard made from wood pulp of about 1 mm. thickness and 6 x 6 cm. square are so painted on both sides that, per sq. m. of surface 200 g. of each of the 3 previously prepared mixtures are evenly applied (=1.44 g./72 cm.²). The cardboard pieces are dried for some days and then subjected to the biological test in the following way:

A pumice stone plate of 6 x 6 x 0.5 cm. is laid in a petri dish of 10 cm. diameter and covered with a 6 x 6 cm. glass plate. The pumice stone plate is saturated with distilled water. The piece of cardboard to be tested is laid on the glass plate and inoculated with 1 ccm. of a suspension of spores of the following composition:

Inoculum: 10 ccm. of Czapek solution are added to 14-day-old slant agar culture of the fungus *Trichoderma viride* and the surface of the culture is carefully scraped and suspended; it is then filtered through fibreglass and the filtrate is used as inoculum. The petri dishes are then closed and the culture is incubated for 10 days at 28° C. The development of a fungal growth is then observed:

Results:

| Active substance | Concentration of active substance | | |
|---|---|---|---|
| | 2% | 0.4% | 0.08% |
| 4-chloroacetyl-acetanilide | No growth | Slight growth. | Moderate growth. |
| Control without active substance. | Strong growth. | Strong growth. | Strong growth. |

Example 2.—Plasticiser for synthetic resins

The active substance, 4-chloroacetyl-acetanilide is dissolved in ethylene glycol monomethyl ether (methyl Cellosolve) in suitable concentrations.

4 parts of this solution are mixed with 5 parts of dioctyl sebacate. The insensitivity of the plasticiser so obtained to fungal and bacterial attack is tested as follows: This plasticiser mixture is added to 91 parts of nutrient agar and the agar mixture is poured into plates. After solidifying, inoculation is made with a 14-day-old culture of *Aspergillus oryzae* or with a 24-hour-old culture of *Escherichia coli* 96. The inoculum is obtained as follows:

10 ccm. of physiological sodium chloride solution are added to each of 14-day-old slant agar cultures of *Aspergillus oryzae* or of 24-hour-old slant agar cultures of *Escherichia coli* 96. The surface of the cultures is carefully scraped and suspended. The suspension is then filtered through fiberglass and the filtrate is used as inoculum.

The nutrient agar used for *Aspergillus oryzae* is Sabouraud-Maltose: mineral salt agar 1:20. If *Escherichia coli* 96 is inoculated, the nutrient agar is nutrient agar; mineral salt agar=1:20.

The methyl Cellosolve solutions contain so much active substance that the concentrations, calculated on the plasticiser, are 2.0%, 0.4% and 0.08%. The plates inoculated with *Aspergillus oryzae* are left for 10 days at 28° C., whilst those inoculated with *Escherichia coli* 96 are kept for 48 hours at 37° C. The development of the organisms on the agar surface is then observed.

TABLE

| Concentrations | *Aspergillus oryzae* | *Escherichia coli* 96 |
|---|---|---|
| 2.0% | No growth | No growth |
| 0.4% | do | Do. |
| 0.08% | do | Growth. |
| Control without active substance. | Growth | Do. |

Example 3.—Washing liquor for various textile fibres

The active substance, N-n-butyl-N'-(4-chloroacetylphenyl)-urea is added in concentrations of 0 mg. and 100 mg. per litre to a soap solution containing 1.5 grams (g.) of anionactive soda-soap per litre. Cotton fabric, wool fabric or nylon staple fabric which has been inoculated with 24-hour-old *Staphylococcus aureus* SG 511 bacteria, cultured in a broth medium, and which fabric has then been incubated several hours, is entered into the washing liquor in the liquor ratio of 1:20 for 20 minutes at 40° C. On finishing the washing procedure, 1 ml. of washing liquor is mixed with 15 ml. of 45° C. warm agar medium and the agar is poured into plates immediately. A sample of the textile material is also taken, spread on a sterile agar plate and incubated for 48 hours.

Thereupon the above fabric is rinsed twice in softened, cold water in a liquor ratio of 1:20 for 3 minutes, then wrung and dried.

Circles 20 mm. in diameter are cut from the prepared fabric and spread on agar plates which have been previously inoculated with *Staphylococcus aureus* SG 511. The plates are then incubated for 48 hours.

After incubation, it is observed that the washing liquor containing the active substance is sterile, whereas that which do not contain the active substance contains a large number of bacteria per ml. Furthermore, those agar plates whereon the textile material has been placed immediately after washing with the liquor containing N-n-butyl-N'-(4-chloroacetyl-phenyl)-urea show no bacteria colonies, whereas those textile fabrics which have not received the active substance are loaded with bacteria. Finally, those agar plates which have previously been inoculated with *Staphylococcus aureus* SG 511 and then covered with fabric discs made of fabric which has been washed in the presence of the active substance, show a bacteria-free zone of several mm. around the disc. In this case, there is no trace of growth of bacterial colonies on the disc itself.

This is in contrast to those fabric discs which have not been washed in the presence of N-n-butyl-N'-(4-chloroacetylphenyl)-urea, and which show no zones wherein bacterial growth is inhibited, furthermore, such fabric discs are covered with bacterial colonies.

| Conc. of N-n-butyl-N'(4-chloroacetyl-phenyl)-urea in the washing liquor | Fabric | Bacteria count per ml of washing liquor | Bacteria on textile sample after the washing process | Width in mm. of the inhibition around the 20 mm. disc | Bacterial colonies on the disc |
|---|---|---|---|---|---|
| 0 | Cotton | App. 70,000 | Large number | 0 | Large number. |
| 100 | do | 0 | None | 7 | None. |
| 0 | Wool | >10$^5$ | Large number | 0 | Large number. |
| 100 | do | 0 | None | 7 | None. |
| 0 | Nylon | >10$^5$ | Large number | 0 | Large number. |
| 100 | do | 0 | None | 1 | None. |

What is claimed is:

1. A process for protecting a site from and disinfecting it against bacteria comprising applying to said site a disinfecting composition containing as an active ingredient a compound of the formula

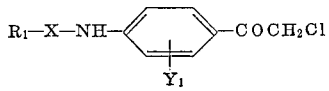

wherein $R_1$ is a member selected from the group consisting of alkyl containing at most three carbons, monochloroalkyl containing at most three carbons and polychloroalkyl containing at most three carbons, phenyl and monochlorophenyl, $Y_1$ is a member selected from the group consisting of hydrogen and chlorine and X is a member selected from the group consisting of —CO— and —SO$_2$— with the limitation that if X is —SO$_2$—, $R_1$ must be a member selected from the group consisting of said alkyl, said monochloroalkyl and said polychloroalkyl.

2. A process for protecting a site from and disinfecting it against bacteria comprising applying to said site a disinfecting composition containing as an active ingredient the compound 4-chloroacetyl-acetanilide.

3. A process for protecting a site from and disinfecting it against bacteria comprising applying to said site a disinfecting composition containing as an active ingredient a compound of the formula

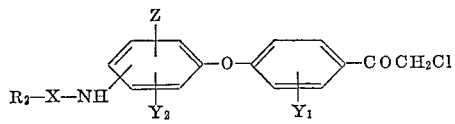

wherein

X is a member selected from the group consisting of —CO— and —SO$_2$—, $R_2$ is a member selected from the group consisting of alkyl containing at most three carbon atoms, monochloroalkyl containing at most three carbon atoms and polychloroalkyl containing at most three carbon atoms, $Y_1$ is a member selected from the group consisting of hydrogen and chlorine, $Y_2$ is a member selected from the group consisting of hydrogen and chlorine with the limitation that when $Y_1$ is chlorine, $Y_2$ is hydrogen, Z is a member selected from the group consisting of hydrogen and —COCH$_2$Cl.

4. A process for protecting a site from and disinfecting it against bacteria comprising applying to said site a disinfecting composition containing as an active ingredient the compound 4-chloroacetyl-2'-chloro-4'-acetamido-diphenyl ether.

5. An antimicrobic composition comprising an antimicrobially effective amount of a compound of the formula

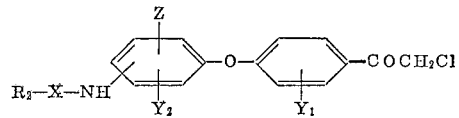

wherein

X is a member selected from the group consisting of —CO— and —SO$_2$—, $R_2$ is a member selected from the group consisting of alkyl containing at most three carbon atoms, monochloroalkyl containing at most three carbon atoms and polychloroalkyl containing at most three carbon atoms, $Y_1$ is a member selected from the group consisting of hydrogen and chlorine $Y_2$ is a member selected from the group consisting of hydrogen and chlorine with the limitation that when $Y_1$ is chlorine, $Y_2$ is hydrogen and Z is a member selected from the group consisting of hydrogen and —COCH$_2$Cl, and an inert carrier.

6. A composition according to claim 5, wherein the carrier is water.

7. A composition according to claim 5, wherein the carrier is organic solvent.

8. A composition according to claim 5, wherein the carrier is ethylene-glycol monomethyl ether.

9. A composition according to claim 5, wherein the carrier is ethylene glycol monomethyl ether and dimethyl formamide 1:1.

10. A process for protecting a site from and disinfecting it against bacteria comprising applying to said site a disinfecting composition containing as an active ingredient a compound of the formula

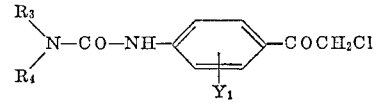

wherein $Y_1$ is a member selected from the group consisting of hydrogen and chlorine, $R_3$ is a member selected from the group consisting of hydrogen, alkyl containing at most five carbons, phenyl and phenyl substituted by one ClCH$_2$CO—, and $R_4$ is a member selected from the group consisting of hydrogen and alkyl containing at most five carbon atoms with the limitation, as to $R_3$ and $R_4$, that the total number of carbons in the alkyl radicals when both $R_3$ and $R_4$ are an alkyl, is at most five.

11. A process for protecting a site from and disinfecting it against bacteria comprising applying to said site a disinfecting composition containing as an active ingredient the compound N-n-butyl-N'-(4-chloroacetylphenyl)-urea.

12. An antimicrobic composition comprising an antimicrobially effective amount of a compound of the formula

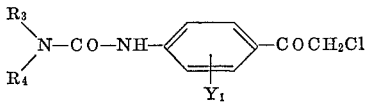

wherein
$Y_1$ is a member selected from the group consisting hydrogen and chlorine,
$R_3$ is a member selected from the group consisting of hydrogen, alkyl containing at most 5 carbons, phenyl and phenyl substituted by one $ClCH_2CO-$, and
$R_4$ is a member selected from the group consisting of hydrogen and alkyl containing at most five carbon atoms with the limitation, as to $R_3$ and $R_4$, that the total number of carbons in the alkyl radicals, when both $R_3$ and $R_4$ are an alkyl, is at most five, and an inert carrier.

13. A textile material coated with a cleansing and washing composition comprising as the active ingredient a compound of the formula

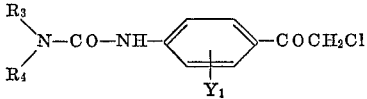

wherein
$Y_1$ is a member selected from the group consisting of hydrogen and chlorine,
$R_3$ is a member selected from the group consisting of hydrogen, alkyl containing at most five carbons, phenyl and phenyl substituted by one $ClCH_2CO-$, and
$R_4$ is a member selected from the group consisting of hydrogen and alkyl containing at most five carbon atoms with the limitation, as to $R_3$ and $R_4$, that the total number of carbons in the alkyl radicals, when both $R_3$ and $R_4$ are an alkyl, is at most five, said active ingredient being present in an amount of from 0.5 to 2%, calculated on the weight of the material.

14. An antimicrobic composition comprising as an active ingredient an antimicrobially effective amount of the compound 4-chloroacetyl-2'-chloro-4'-acetamido-diphenyl ether, and an inert carrier.

15. An antimicrobic composition comprising as an active ingredient an antimicrobially effective amount of the compound N-n-butyl-N'-(4-chloroacetylphenyl)-urea, and an inert carrier.

16. An antimicrobic composition comprising as an active ingredient an antimicrobially effective amount of the compound N,N'-bis-(4-chloroacetylphenyl)-urea, and an inert carrier.

17. An antimicrobic composition comprising as an active ingredient an antimicrobially effective amount of the compound N-phenyl-N'-(4-chloroacetylphenyl)-urea, and an inert carrier.

References Cited by the Examiner

UNITED STATES PATENTS

| | | | |
|---|---|---|---|
| 2,485,339 | 10/1949 | Van Eijk | 167—30 |
| 2,490,100 | 12/1949 | Smith | 106—15 |
| 2,491,287 | 12/1949 | Smith | 106—15 |
| 2,727,007 | 12/1955 | Little et al. | 252—106 |
| 2,965,575 | 12/1960 | Beaver et al. | 252—106 |
| 3,096,237 | 7/1963 | Kuhle | 167—30 |

OTHER REFERENCES

Chemical Abstracts, vol. 43, col. 1734h (1949).

JULIAN S. LEVITT, *Primary Examiner.*